C. T. ALEXANDER AND D. W. BAKER.
AUTOMATIC MECHANISM FOR RAISING LIQUID.
APPLICATION FILED MAY 19, 1919. RENEWED NOV. 8, 1920.

1,362,552.

Patented Dec. 14, 1920.

INVENTORS
Charles T. Alexander
D Ward Baker
BY
Warren D. House
Their ATTORNEY

Witness:
R. E. Hamilton

UNITED STATES PATENT OFFICE.

CHARLES T. ALEXANDER AND D WARD BAKER, OF CHANUTE, KANSAS.

AUTOMATIC MECHANISM FOR RAISING LIQUID.

1,362,552.  Specification of Letters Patent.  Patented Dec. 14, 1920.

Application filed May 19, 1919, Serial No. 298,151. Renewed November 8, 1920. Serial No. 422,703.

*To all whom it may concern:*

Be it known that we, CHARLES T. ALEXANDER and D WARD BAKER, citizens of the United States, residing at Chanute, in the county of Neosho and State of Kansas, have invented a certain new and useful Improvement in an Automatic Mechanism for Raising Liquid, of which the following is a specification.

Our invention relates to improvements in automatic mechanisms for raising liquid.

It is adapted particularly for ejecting water from a gas or oil well and for raising oil from an oil well.

The object of our invention is to provide a mechanism of the kind described which may be readily applied to any oil, gas or other well, which is simple in construction and operation, which is durable and not liable to get out of order, which will automatically operate upon the rise to a predetermined point in the well of water or other liquid, which is cheap to manufacture, which may be readily repaired by the use of materials ordinarily at hand, and which is efficient in operation.

The novel features of our invention are hereinafter fully described and claimed.

In the accompanying drawings, which illustrate the preferred embodiment of our invention.

Fig. 4 is a view, partly in side elevation and partly in vertical section of a portion of the float and some of the parts connected therewith.

Fig. 5 is a view similar to Fig. 4, looking in a direction at right angles to that in which Fig. 4 is viewed.

Fig. 13 is a view similar to Fig. 12 looking in a direction at right angles to that in which Fig. 12 is viewed, and taken on the line 13—13 of Fig. 15.

Similar reference characters designate similar parts in the different views.

1 designates the usual well casing having on its top a cap 2 provided with one or more outlets 3 having removable closures 4. We provide an eduction conductor which conveys liquid from the well, and a second conductor which discharges fluid, such as compressed air or steam under pressure into the eduction conductor for the purpose of ejecting liquid from the well.

Figures 1, 2, 3:
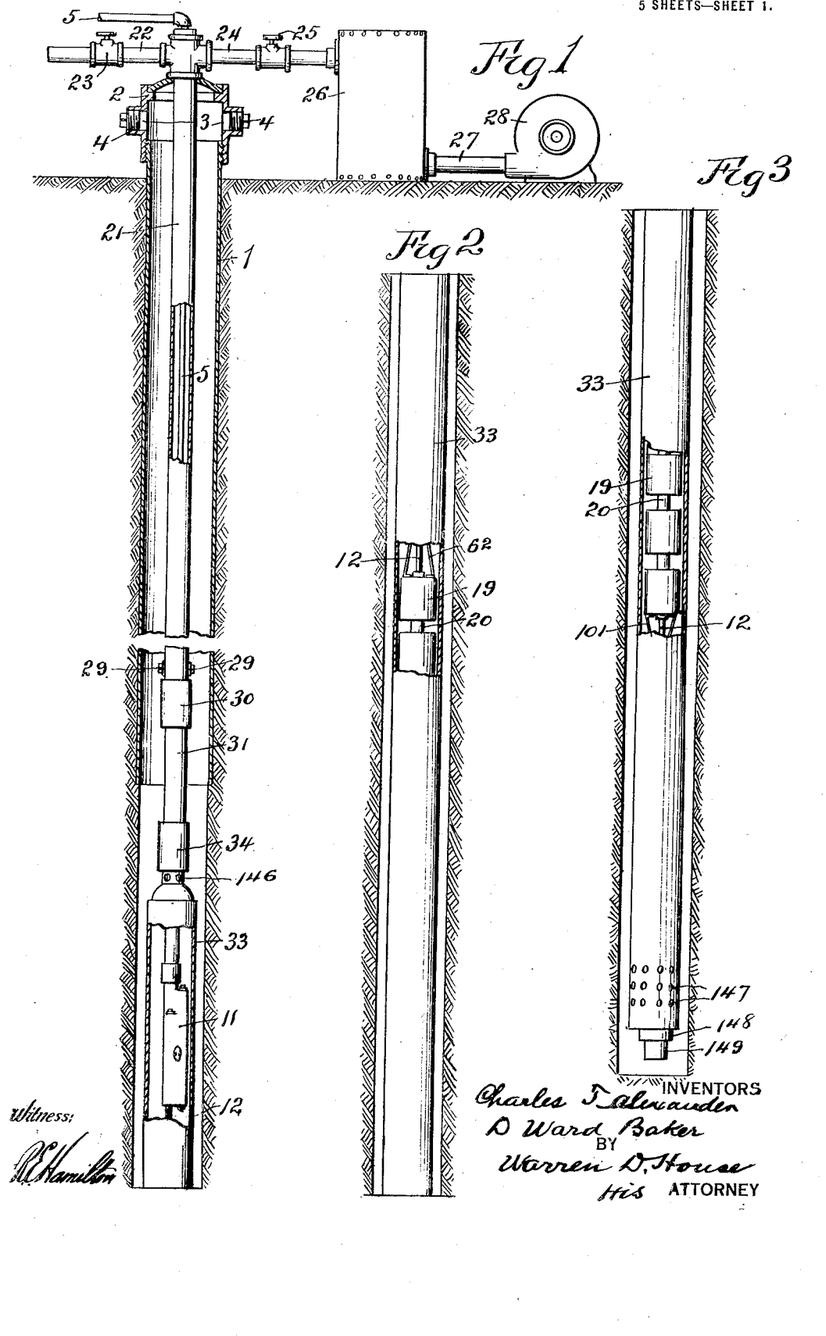
Figures 1, 2 and 3 are views partly in side elevation and partly in vertical section, and partly broken away, of the upper, intermediate and lower portions respectively of our improved mechanism.
Figure 8:
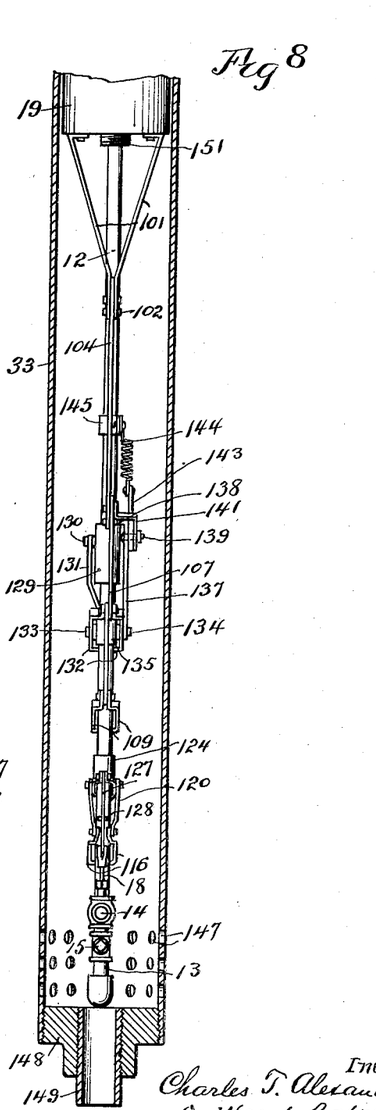
Figure 9:
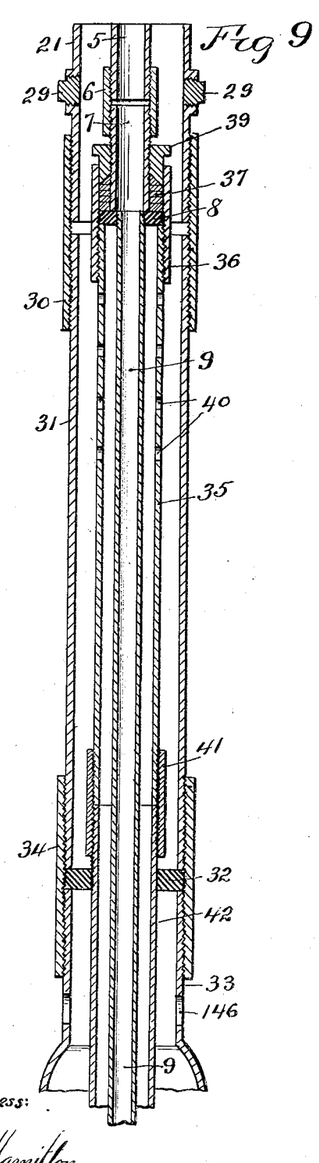
Fig. 9 is an enlarged vertical sectional view of a portion of the eduction conductor, and the inclosing conductor which supplies fluid under pressure to the eduction conductor.
Figure 10:
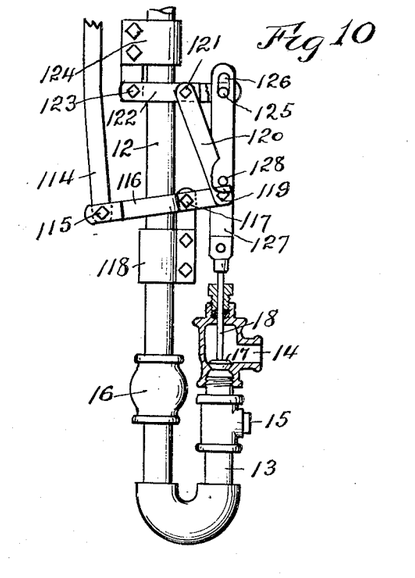
Fig. 10 is an enlarged view partly in side elevation and partly in vertical section of the lower portion of the eduction conductor and parts connected therewith.
Figure 11:
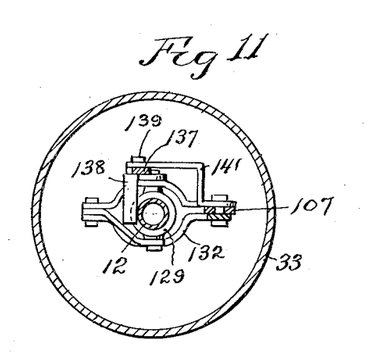
Fig. 11 is an enlarged cross section on the line 11—11 of Fig. 7.
Figure 12:
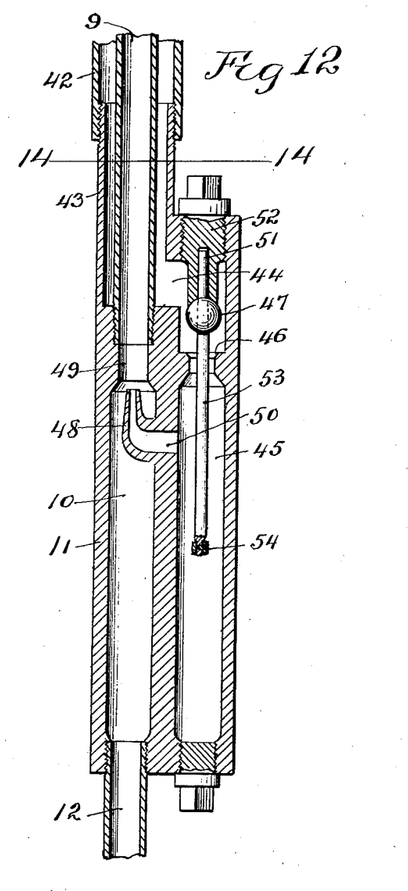
Fig. 12 is an enlarged vertical sectional view of a portion of the mechanism which operates the valve controlling the discharge of fluid to the jet nozzle and parts connected therewith taken on the line 12—12 of Fig. 14.

The eduction conductor comprises an upper section 5, Fig. 1, the lower end of which is connected by a coupling 6, Fig. 9, with a section 7, the lower end of which bears against a bushing 8 in which is secured the upper end of a section 9 of smaller diameter than the section 7, the lower end of the section 9 being in communication with a chamber 10 of a valve housing casting 11, Fig. 12. Connected at its upper end to the housing 11 and communicating with the chamber 10, is a section 12, which at its lower end, near the bottom of the well, has an upturned portion 13 having an inlet 14, Figs. 7 and 8, and an inlet which is adapted to be closed by a removable plug 15, Fig. 10. The section 12 is provided with an upwardly opening check valve 16, Figs. 7 and 10. For preventing upward discharge through the eduction conductor, the portion 13 is provided with a valve seat adapted to have seated therein a downwardly closing valve 17, Figs. 7 and 10, having a vertical stem 18 adapted, as hereinafter described, to be actuated by a float comprising a plurality of sections 19 slidably mounted on the section 12 and connected together by couplings 20, Fig. 6.

The second conductor which supplies the eduction conductor with fluid under pressure comprises an upper section 21, Fig. 1, which encircles the section 5, and which extends through the top of the cap 2, and which at its upper end is provided with a discharge branch 22, having a shut off valve 23, and which has a branch 24 provided with a shut off valve 25 and connected with a compressed air tank 26, which is supplied with air or other fluid under pressure by a conductor 27, which may be connected, as shown, with an air compressor 28, Fig. 1. The section 21 is provided within the casing 1 with one or more inlets adapted to be closed by removable plugs 29, the latter being removed when it is desired to employ the gas in the well for supplying the eduction conductor with fluid under pressure, as will be described.

When the gas pressure is to be used, the valve 25 may be closed and the air compressor 28 not used.

The lower end of the section 21 is connected by a coupling 30, Figs. 1 and 9, with a pipe section 31, the lower end of which bears against a bushing 32 which rests upon the upper end of a section 33, connected by a coupling 34 with the section 31 and which forms a casing in which the float sections 19 slide vertically.

As shown best in Fig. 9, the bushing 8 rests upon the upper end of a pipe section 35 on the upper end of which is mounted a coupling 36 containing packing rings 37 which are forced against the bushing 8 by a screw-threaded collar 39 slidably mounted in the coupling 36 and having threaded connection with the section 7 which is encircled by the packing collars 37. This construction permits the sections 5 and 7 to be withdrawn without removing the sections 9 and 35. The section 35 is provided with one or more holes 40, for permitting the fluid under pressure to pass from the section 31 into the section 35. The lower end of the latter is connected by a coupling 41, Fig. 9, with the upper end of a pipe section 42, on the screw-threaded upper end of which is mounted the bushing 32.

The lower end of the section 42 is fitted on the screw-threaded upper end of a tubular extension 43, on the upper end of the valve housing 11.

The interior of the tubular extension 43 is connected by a passage 44, Fig. 12, with a chamber 45 in the housing 11. Said passage 44 is provided with a valve seat 46, upon which is adapted to rest a ball valve 47, Fig. 12, for the purpose of closing the passage 44.

In the chamber 10, Fig. 12, is provided a jet nozzle 48 which is located centrally and discharges upwardly through a passage 49 into the lower end of the eduction section 9. The jet nozzle 48 is connected by a passage 50 with the chamber 45.

The valve 47 is provided with an upwardly extending stem 51 slidably mounted in a screw plug 52, which is fitted in a threaded hole in the upper end of the housing 11 communicating with the passage 44.

Figure 15:
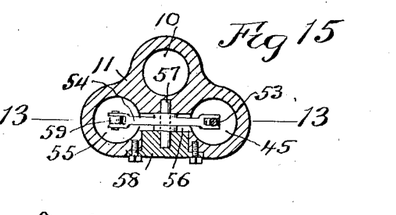
Fig. 15 is a cross section on the line 15—15 of Fig. 13.

The valve 47 closes by gravity and by pressure applied from above in the passage 44. The valve 47 is lifted by means of a vertical rod 53, Figs. 12 and 13, extending through the valve opening into the passage 44 and chamber 45. The lower end of the rod 53 is pivoted to one end of a lever 54, which extends through a passage connecting the chamber 45 with a chamber 55 in the housing 11. Said passage is indicated by 56, Figs. 13 and 15. The lever 54 is pivoted at its middle on a horizontal pin 57 located in the passage 56 and having one end mounted in the housing 11 and the other end mounted in a cap 58, Fig. 15, mounted in one side of the housing 11.

The other end of the lever 54 is pivoted to the upper end of a vertical rod 59, which extends through a tubular plug 60, which is fitted in a screw-threaded hole in the lower end of the housing 11 and which communicates with the chamber 55. The upper end of the tubular screw plug 60 is provided with a valve seat, on which is adapted to rest a spherical valve 61, secured to the rod 59 in the chamber 55.

When the rod 59 is raised, which is effected by the lowering to a pre-determined height of the float sections 19, the rod 53 lowers so as to permit the valve 47 to seat and close the valve opening. When the float rises to a pre-determined height, the rod 59 will be pulled downwardly, thereby swinging the lever 54 so as to lift the valve 47 from its seat 46. Fluid pressure in the passage 44 will be communicated to the chamber 45, thus causing a jet of steam, compressed air or gas, as the case may be, to be projected upwardly into the passage 49 through the jet nozzle 48, thereby effecting an upward flow of liquid from the section 12 and chamber 10 through the sections 9 and 5, such liquid being discharged to the open air from the upper end of the section 5.

We will now describe the lever mechanism by which the rise and fall of the float sections 19 respectively lowers and lifts the rod 59 and effects an opening and closing of the valve 47.

Figures 4, 5:
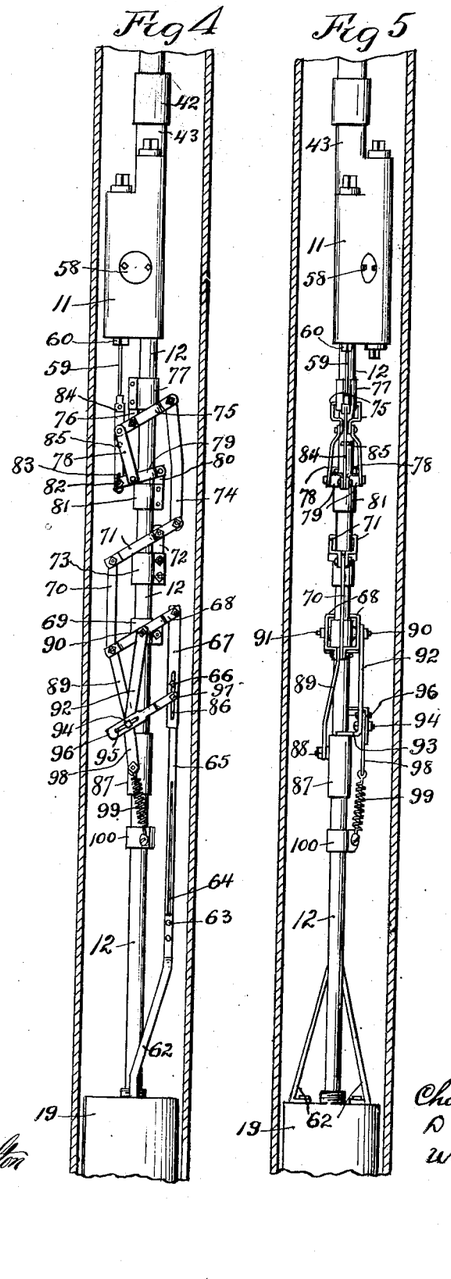

Secured to the top of the upper float section 19, Figs. 4 and 5, are two upwardly extending bars 62, to which is secured a transverse pin 63 slidably mounted in a longitudinal slot 64 provided in a vertical bar 65 which carries a pin 66 which extends through and is slidable in a bar 67, the upper end of which is pivoted to the adjacent ends of two levers 68 pivoted to a collar 69 fastened to the section 12. The other ends of the levers 68 are pivoted to the lower end of a link 70, the upper end of which is pivoted to two levers 71 which are pivoted to a plate 72 rigidly fastened to a collar 73 rigidly secured to the section 12. The other ends of the levers 71 are pivoted to the lower end of a link 74, the upper end of which is pivoted to a lever 75, which is pivoted to a plate 76 rigidly secured to a collar 77, which is rigidly attached to the section 12.

The other ends of the levers 75 are pivoted to the upper ends of two links 78, the lower ends of which are pivoted to two levers 79, which are pivoted to a plate 80 which is rigidly attached to a collar 81, rigidly fastened to the section 12.

The levers 79 have mounted in them a bolt 82 which is slidably mounted in a slot 83 provided in the lower end of a vertical plate 84, which has its upper end rigidly attached to the lower end of the rod 59. The plate 84 carries a pin 85 which is adapted to strike against the adjacent ends of the levers 75 so as to pull down the rod 59 to lift the valve 47 before the pin or bolt 82 reaches the lower end of the slot 83, when the float has risen to a predetermined position. After the float has risen above said predetermined position, the bolt 82 reaches the lower end of the slot 83, upon which the levers 79 will move the plate 84 downwardly more rapidly, owing to the links 78 being connected to the levers 79 intermediate of the pivot point of the latter and the bolt 84. Owing to the greater leverage exerted by the levers 75 operating on the pin 85, the valve 47 will have more power exerted upon it to open it or raise it from its seat than will be effected upon it afterward in its opening movement.

In Fig. 4 and Fig. 5, the float is shown as having lowered a certain amount without affecting the mechanism which opens the valve 47 and closes the valve 61. Further movement of the float downwardly will cause the bars 62, through the pin 63 to pull downwardly the bar 67, after the pin 66 reaches its downward movement in the slot 86, which is provided in the bar 67 for the insertion therethrough of the pin 66. The downward movement of the bar 67 will lift the rod 59 and lower the valve 47 by means of the levers 68 link 70, levers 71, link 74, levers 75, links 78 levers 79, bolt 82 and plate 84. This action will bring the pin 85 into position to be struck by the levers 75 when the adjacent ends of the latter are again moved downwardly.

For the purpose of locking the valve 47 from accidental closing, we provide the following described mechanism. Referring particularly to Figs. 4 and 5, 87 designates a sleeve slidably mounted on the section 12 and having projecting laterally from it a horizontal screw 88, Fig. 5, to which is pivoted the lower end of a bar 89, the upper end of which is pivoted to the bar 70 and the two levers 68, the latter being pivoted to the collar 69 by two laterally extending bolts 96 and 91. The upper end of a bar 92 is pivoted to the bolt 90 and its lower end is provided with a right-angled arm 93, Fig. 5, which is adapted to engage the upper end of the sleeve 87 so as to hold the latter from upward movement from the position shown in Figs. 4 and 5. The sleeve 87 being held from upward movement, by means of the bar 89 holds the levers 68 from being swung so as to close the valve 47 through the intermediacy of the intervening mechanism already described.

In order to release the sleeve 87 from the locking arm 93 of the bar 92, the latter has mounted in it a transverse bolt 94 which extends through and is slidable in a longitudinal slot 95 provided in a bar 96, in which is mounted a bolt 97, Fig. 4, which extends through the slot 86 and is mounted in the bar 65.

Pivoted to the bolt 94 is a plate 98 having attached to it the upper end of a coil spring 99, the lower end of which is attached to a collar 100 which is rigidly attached to the section 12.

When the float sections 19 move downwardly, so as to draw downwardly the bar 65, the bolt 97 carried by said bar will swing downwardly the upper end of the plate 96, as viewed in Fig. 4. As the plate 96 moves toward the horizontal position, the bolt 94 will reach the right end of the slot 95, upon which the plate 96 will swing the plate 92 so as to disengage the arm 93 of the latter from the upper end of the sleeve 87. The latter will now be free to move upwardly when the bar 65 on the continued downward movement of the float will draw down the bar 67 so as to swing the levers 68 in a direction such that the valve 47 will be moved toward the closed position.

When the float rises, so as to swing the levers 68 to the position shown in Figs. 4 and 5, the spring 99 operating through the plate 98 will swing the plate 92 into a position in which its arm 93 will again engage the upper end of the sleeve 87, as shown in Fig. 5.

Figure 7:
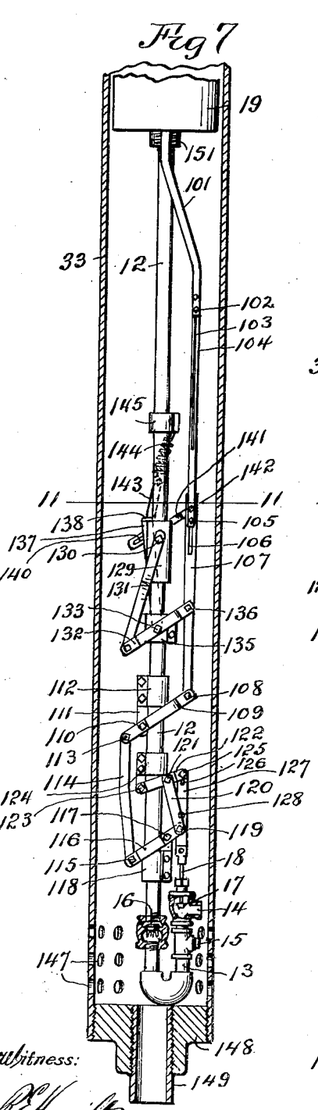
Figs. 7 and 8 are enlarged views, partly in vertical section and partly in side elevation, viewed in two directions at right angles to each other, of a portion of the float, parts connected therewith and the lower portion of the casing inclosing said parts.

For the purpose of closing the valve 17, Figs. 7 and 8, when the float lowers, we provide a multiplying leverage mechanism similar to the multiplying leverage system just described which connects the upper float section with the valve rod 59.

Referring particularly to Figs. 7 and 8, the float section 19, being the lowermost float section, is shown in its uppermost position. Two bars 101 are secured at their upper ends to the bottom of the lowermost float section 19. The lower ends of the bars 101 are connected by a bolt 102 extending through and slidable in a longitudinal slot 103 in a bar 104, the lower end of which has secured to it a bolt 105, which is slidable in a longitudinal slot 106 provided in a vertical bar 107, the lower end of which is pivoted by a bolt 108 to two levers 109, which are pivoted to a bolt 110 mounted in a plate 111 secured to a collar 112 rigidly fastened to the pipe section 12. The other ends of the levers 109 are pivoted by a bolt 113 to a link 114, the lower end of which is pivoted by a bolt 115 to two levers 116, which are pivoted by a bolt 117 to a collar 118 which is rigidly secured to the pipe section 12. The other ends of the levers 116 are pivoted by a bolt 119 to two links 120, which are pivoted by a bolt 121 to two levers 122, which are pivoted by a bolt 123 to a collar 124 rigidly secured to the pipe section 12.

Connecting the levers 122 is a bolt 125 which is slidable in a slot 126 provided in a vertical plate 127, the lower end of which is rigidly attached to the valve stem 18.

When the float lowers and the bolt 102 reaches the lower end of the slot 103, the bar 104 will be forced downwardly, and when the bolt 105 reaches the end of the slot 106, the bar 107 will force downwardly to the closed position the valve 17, through the intermediacy of the stem 18, plate 127, levers 122, links 120, levers 116, link 114 and levers 109.

In order that the valve 17 may be easily started from its seat, there is provided in the plate 127 a transverse pin 128, located above the levers 116 and adapted to be struck and lifted by said levers when the float rises, before the bolt 125 reaches the upper end of the slot 126. A greater leverage for lifting the valve is thus afforded that is obtained by the lifting effect of the bolt 125, owing to the links 120 being pivoted to the levers 122 intermediate of the bolts 123 and 125.

To hold the valve 17 from accidental closing, the following described mechanism is employed.

Slidable on the pipe section 12 is a sleeve 129 provided with a transverse bolt 130, to which is pivoted the upper end of a link 131, the lower end of which is pivoted to two levers 132, which are pivoted by bolts 133 and 134 respectively to a collar 135, which is rigidly attached to the section 12, Figs. 7 and 8. The levers 132 are pivoted by a bolt 136 to the bar 107. The sleeve 129 is slid upwardly when the bar 107 moves downwardly due to the lowering of the float by means of the levers 132 and the link 131.

For holding the sleeve 129 from moving upwardly, the lower end of a plate 137 is pivoted to the bolt 134, Fig. 8, and the upper end of the plate 137 is provided with a lateral locking arm 138 which is adapted to engage the upper end of the sleeve 129 to releasably hold it from moving upwardly from the position shown in Figs. 7 and 8.

To release the locking arm 138 from the sleeve 129, at the proper time, the bar 137 has mounted in it a transverse bolt 139, Fig. 8, which is slidable in a longitudinal slot 140, provided in a plate 141, Fig. 7, which has secured to it a bolt 142 which is slidable in the slot 106 of the bar 107.

Pivoted to the bolt 139 is a plate 143, the upper end of which is attached to the lower end of a coil spring 144, the upper end of which is attached to a collar 145 which is rigidly secured to the section 12.

When the float lowers, sufficiently to force downwardly the bar 104, the bolt 142 carried thereby will swing the lever 141 toward the horizontal position, thus forcing outwardly the plate 137, by means of the plate 141, so as to release the arm 138 from the sleeve 129. Further downward movement of the bar 104 will cause the bolt 105 to reach the lower end of the slot 106 and thereby force downwardly the bar 107, and lifting the sleeve 129 by means of the levers 132 and link 131, and forcing the valve 17 to the closed position by the mechanism already described.

The coil spring 144 normally forces the locking plate 137 to the locking position when the latter is permitted to return to such position by the plate 141.

The pipe section or casing 33 in which are mounted the float, valve housing 11 and valve operating mechanism, is provided near its upper end with relief holes 146, Figs. 1 and 9, which permits the escape therethrough of fluid, so that liquid may enter the section 33 through holes 147, Figs. 3, 7 and 8, provided in the lower portion of the pipe section 33, the lower end of which has fitted in it a screw-threaded tubular plug 148, in which is mounted a vertical pipe 149, which also permits liquid to enter the pipe section 33 when the pipe 149 is not resting in earth or on rock.

Figure 6:
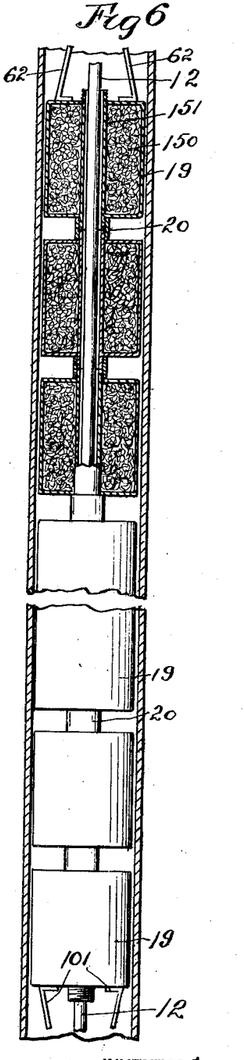
Fig. 6 is a view partly in vertical section, partly broken away and partly in side elevation, of the float and some of the parts connected therewith.

Each float section 19 may be hollow and may contain some light filling material, such as cork 150, Fig. 6. When a hollow float section is used, it may be provided with a central vertical tube 151 having screw-threaded projecting upper and lower ends. Adjacent ends of adjacent tubes 151 may be connected by couplings 20, as shown.

In the operation of our invention, the parts having been assembled as shown in the drawing, for the purpose of raising liquid from a gas or other well, the air compressor 28 is operated to obtain air under compression in the tank 26. The valve 23 is closed and the valve 25 is opened. Air from the tank will then pass through the conductor 24 into the pipe section 21, Fig. 1, and will pass downwardly therethrough and through the holes 40 into the pipe section 35, thence into the pipe section 42, Fig. 9, and thence into the tubular extension 43 of the valve housing 11. If the liquid in the well is low, the float will be in a low position, and the valves 47 and 17 will be closed, thus shutting the air pressure off from the chamber 45 of the housing 11.

When the liquid rises in the well so as to lift the float sections 19, the latter will open the valves 47 and 17 by means of the two multiplying lever devices, as already described, upon which the liquid in the well will enter the eduction conductor section 12. The casing 1 being closed at the top, there will be a gas pressure in the well which will force the liquid through the section 12 into the chamber 10 and eduction section 9. The air pressure in chamber 24 will force air upwardly through the jet nozzle 48, thus forcing the liquid from chamber 10 upwardly and out through the eduction sections 9 and 5.

When the liquid has been forced from the well sufficiently to permit the float sections 19 to fall to the proper position, the bars 62 and 104 will respectively release the locking arms 93 and 138 from engagement with the sleeves 87 and 129, following which the continued lowering of the float sections will operate the two lever mechanisms so as to close the valves 47 and 17. The air pressure will now be cut off from the chamber 45 by the valve 47, and the valve 17 will prevent gas from passing out through the eduction conductor.

Figure 13:
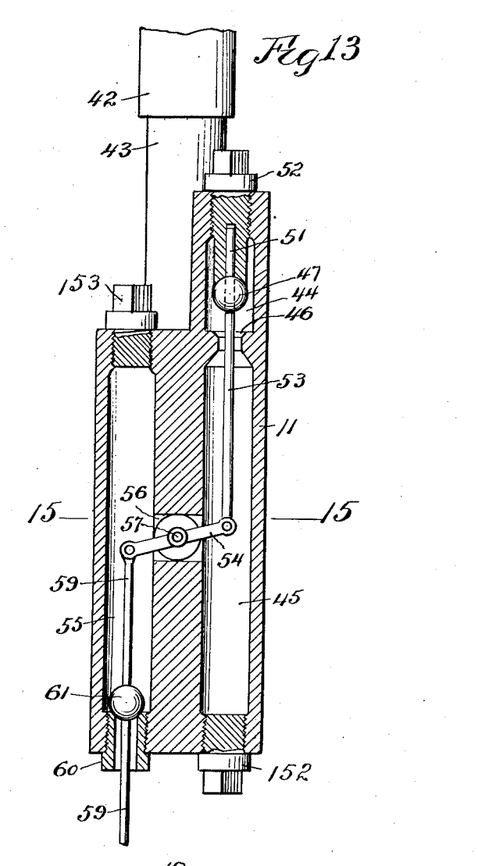

The valve 61, Fig. 13, serves to prevent the compressed fluid which is in chambers 45 and 55 from passing downwardly through the pipe 60 into the section 33, when the valve 47 is in the open position.

When it is desired to utilize the compressed gas in the well, for ejecting the liquid therefrom, the valve 25 is closed and the air compressor 28 stopped. The plugs 29 are then removed from the section 21, thus permitting the gas which is in the well under pressure to enter the section 21, from which it will pass through the holes 40 in the section 35 and thence into the section 42, through the tubular extension 43, passage 44, past the valve 47, when the latter is opened, into the chamber 45 and thence through the jet nozzle 48 through the passage 49 and out through the sections 9 and 5.

When it is desired to raise liquid from a well which does not contain gas under pressure, it is not necessary to use the valve 17, so that the mechanism which connects this valve with the float may be disconnected at any one of the joints in the lever mechanism. The plug 15 may then be removed to freely admit oil or water into the eduction conductor. Or, if desired, the entire lever mechanism which operates the valve 17 and the latter may be removed, in which case it will not be necessary to remove the plug 15.

Gas may be withdrawn from the well by removing either one of the plugs 4 or by removing the plugs 29 in the section 21, and closing the valve 25 and opening the valve 23.

Figure 14:
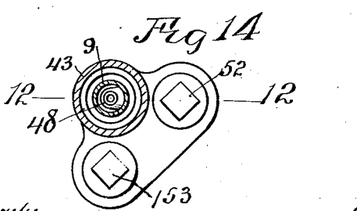
Fig. 14 is a cross section on the line 14—14 of Fig. 12.

The lower end of chamber 45 and the upper end of chamber 55 may be respectively provided with screw threaded holes normally closed by means of screw plugs 152 and 153, Figs. 13 and 14.

With the use of our invention the water or oil may be removed from a well without subjecting the walls of the well to pressure which would tend to drive the oil back into the sand. By means of our improved multiplying leverage mechanisms, the float can easily lift the valves 47 and 17 from their seats, while at the same time the float has a very considerable range of movement.

The employment of the jet nozzle 48 operated by fluid under pressure affords a simple and efficient means for elevating the liquid without having the objectionable features of the usual pumping mechanism.

We do not limit our invention to the structure shown and described, as modifications, within the scope of the appended claims, may be made without departing from the spirit of our invention.

What we claim is:—

1. In a mechanism for raising liquid, a well casing, an eduction conductor extending therethrough having a jet nozzle discharging upwardly therein, a valve for preventing the discharge upwardly of fluid through said conductor, means for supplying fluid under pressure to said jet nozzle, a float, means actuated by said float for controlling discharge of fluid through said jet nozzle, and means actuated by said float for opening said valve.

2. In a mechanism for raising liquid, a well casing, an eduction conductor extending therethrough having a jet nozzle discharging upwardly therein, a valve for preventing the discharge upwardly of fluid through said conductor, means for supplying fluid under pressure to said jet nozzle, a valve controlling said fluid supplying means, a float, and means actuated by said float for actuating said valves.

3. In a mechanism for raising liquid, an eduction conductor having a jet nozzle discharging upwardly therein, a second conductor discharging into said jet nozzle, means for supplying said second conductor with fluid under pressure, a valve controlling the discharge of fluid from second conductor into said jet nozzle, a valve for preventing the upward discharge of fluid through the eduction conductor, a float, and means actuated by said float for controlling the operation of said valves.

4. In a mechanism for raising liquid, a well casing, an eduction conductor having a jet nozzle discharging upwardly therein, a valve for preventing the upward discharge of fluid through said conductor, a second conductor through which said eduction conductor extends, extending through said well casing and discharging into said jet nozzle, means for supplying fluid under pressure through said second conductor, a float, and means actuated by said float for controlling the operation of said valve and the discharge of fluid from said second conductor to said jet nozzle.

5. In a mechanism for raising liquid, a well casing, an eduction conductor having a jet nozzle discharging upwardly therein, a second conductor extending through said well casing and discharging into said jet nozzle, means for supplying fluid under pressure to said second conductor, two valves respectively controlling the discharge of fluid through said two conductors, a float, and means actuated by said float for controlling the operation of said valves.

6. In a mechanism for raising liquid, a well casing closed at the top, an eduction conductor having a jet nozzle discharging upwardly therein, a second conductor extending through said well casing and discharging into said jet nozzle and provided with an inlet communicating with the interior of said well casing and having a closure removably mounted in said inlet, two valves respectively controlling the discharge of fluid through said conductors, a float, and means actuated by said float for controlling the operation of said valves.

7. In a mechanism for raising liquid, a well casing closed at the top, an eduction conductor having a jet nozzle discharging upwardly therein, a second conductor extending through said well casing and discharging into said jet nozzle and having an inlet within said well casing communicating interiorly therewith, a float, and means actuated by the float for controlling discharge of fluid through said conductors.

In testimony whereof we have signed our names to this specification.

CHARLES T. ALEXANDER.
D WARD BAKER.